United States Patent
Stellet et al.

(10) Patent No.: US 12,494,048 B2
(45) Date of Patent: Dec. 9, 2025

(54) METHOD FOR CHECKING THE PERFORMANCE OF A PREDICTION TASK BY A NEURAL NETWORK

(71) Applicant: Robert Bosch GmbH, Stuttgart (DE)

(72) Inventors: Jan Stellet, Stuttgart (DE); Matthias Woehrle, Bietigheim-Bissingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 299 days.

(21) Appl. No.: 18/459,281

(22) Filed: Aug. 31, 2023

(65) Prior Publication Data
US 2025/0078481 A1 Mar. 6, 2025

(30) Foreign Application Priority Data
Sep. 9, 2022 (DE) ...................... 10 2022 209 403.4

(51) Int. Cl.
*G06K 9/00* (2022.01)
*G06T 7/246* (2017.01)
(Continued)

(52) U.S. Cl.
CPC ............ *G06V 10/776* (2022.01); *G06T 7/248* (2017.01); *G06V 10/82* (2022.01); *G06T 2207/20081* (2013.01); *G06T 2207/20084* (2013.01)

(58) Field of Classification Search
CPC ...... G06V 10/776; G06V 10/82; G06V 20/58; G06V 10/62; G06V 10/26; G06V 10/40;
(Continued)

(56) References Cited

U.S. PATENT DOCUMENTS

2020/0084427 A1* 3/2020 Sun ..................... G06N 3/045

FOREIGN PATENT DOCUMENTS

| CN | 111160115 A | * | 5/2020 | ............. G06N 3/045 |
| CN | 112907557 A | * | 6/2021 | ............. G06N 3/045 |
| CN | 114943870 A | * | 8/2022 | ............. G06V 10/75 |

OTHER PUBLICATIONS

Liu et al., "Future Frame Prediction for Anomaly Detection—A New Baseline," 2018 IEEE/CVF Conference on Computer Vision and Pattern Recognition, 2018, pp. 6536-6545.
(Continued)

*Primary Examiner* — Xin Jia
(74) *Attorney, Agent, or Firm* — NORTON ROSE FULBRIGHT US LLP

(57) ABSTRACT

A method for checking the performance of a prediction task by a neural network. The method includes: supplying image data to a feature extraction network that is trained to determine a representation of the image data; supplying the determined representation to a prediction network; a first determination of an optical flow between the image data and further image data from the representation; a second determination of the optical flow between the image data and the further image data from the image data using a different calculation path; and comparing the result of the first determination of the optical flow with the result of the second determination of the optical flow and accepting a result of the prediction task as correct if the result of the first determination of the optical flow agrees with the result of the second determination of the optical flow within a predefined tolerance.

9 Claims, 3 Drawing Sheets

(51) Int. Cl.
*G06V 10/776* (2022.01)
*G06V 10/82* (2022.01)

(58) Field of Classification Search
CPC .... G06V 10/764; G06V 10/774; G06T 7/248;
G06T 2207/20081; G06T 2207/20084;
G06N 3/0455; G06N 3/08; G06N 3/04
See application file for complete search history.

(56) References Cited

OTHER PUBLICATIONS

Qiang et al., "Anomaly Detection Based on Latent Feature Training in Surveillance Scenarios," IEEE Access, vol. 9, 2021, pp. 68108-68117.

* cited by examiner

METHOD FOR CHECKING THE PERFORMANCE OF A PREDICTION TASK BY A NEURAL NETWORK

CROSS REFERENCE

The present application claims the benefit under 35 U.S.C. § 119 of German Patent Application No. DE 10 2022 209 403.4 filed on Sep. 9, 2022, which is expressly incorporated herein by reference in its entirety.

FIELD

The present invention relates to methods for checking the performance of a prediction task by a neural network.

BACKGROUND INFORMATION

Prediction tasks performed by neural networks may be used for many control applications. For example, a prediction task such as pedestrian detection is performed by a neural network (i.e., a deep learning component) for an autonomous vehicle. The neural network is trained for this prediction task but it is difficult to predict for which input data (e.g., images) the prediction (e.g., detection) will work well and for which it will work poorly, i.e., there are uncertainties.

Since it is desirable for uncertainties to be detected so that, for example, a controller of an autonomous vehicle can take them into consideration, effective procedures are desirable which make it possible to detect such uncertainties (and thus problems or anomalies in the prediction).

SUMMARY

According to various embodiments of the present invention, a method for checking the performance of a prediction task by a neural network is provided, comprising: supplying image data to a feature extraction network that is trained to determine, for the image data supplied thereto, a representation of the image data for the performance of the prediction task; supplying the representation determined by the feature extraction network to a prediction network that is trained to carry out the prediction task; a first determination of an optical flow between the image data and further image data from the representation; a second determination of the optical flow between the image data and the further image data from the image data via a different calculation path than via the calculation of the representation and the determination of the optical flow from the representation; and comparing the result of the first determination of the optical flow with the result of the second determination of the optical flow and accepting a result of the prediction task as correct if the result of the first determination of the optical flow matches the result of the second determination of the optical flow within a predetermined tolerance.

By dividing (i.e., common use) the representation between the prediction task and the monitoring task (i.e., the result of the first determination of the optical flow is compared with the result of the second determination), the method described above makes an effective monitoring of the performance of the prediction task possible, since a poor representation of the image data is reflected not only in the result of the prediction task but also in the (first) determination of the optical flow.

The result of the determinations of the optical flow can relate to a portion of an image or to an entire image. In other words, the result of the determinations of the optical flow can be a local or a global result for the optical flow (with regard to an image). Similarly, the result of the prediction task can be a local or a global result (with regard to an image).

Various exemplary embodiments of the present invention are specified below.

Exemplary embodiment 1 is a method for checking the performance of a prediction task by a neural network, as described above.

Exemplary embodiment 2 is a method according to exemplary embodiment 1, wherein the prediction task is a prediction task for the control of a robot device and the robot device is controlled on the basis of the result of the prediction task if the result of the first determination of the optical flow agrees with the result of the second determination of the optical flow within the predefined tolerance (and otherwise is not used and, for example, rejected). The agreement of the results for a portion of an image can be decisive for the use of a prediction result which relates to the portion, for example when a robot device wishes to move within a surrounding region that is shown by this portion. The use of the result of the prediction task can therefore depend on how well the results of the optical flow agree for an image region to which the prediction task (and, for example, a task to be carried out by a robot device) relates.

By monitoring the performance of the prediction task, the control of the robot device (in particular its safety) is thus improved.

Exemplary embodiment 3 is a method according to exemplary embodiment 2, wherein a safety measure is taken in the control of the robot device if the result of the first determination of the optical flow does not agree with the result of the second determination of the optical flow within the predefined tolerance.

Accidents due to an error in the prediction result can thus be prevented.

Exemplary embodiment 4 is a method according to any one of exemplary embodiments 1 to 3, wherein further training of the neural network is carried out if the result of the first determination of the optical flow does not agree with the result of the second determination of the optical flow within the predefined tolerance.

The neural network can thus be improved such that it is retrained for types of input data for which it has been poorly trained, and then provides better results for them.

Exemplary embodiment 5 is a method according to any one of exemplary embodiments 1 to 4, wherein the first determination of an optical flow between the image data and further image data from the representation is performed by means of a neural task head network and the neural task head network is trained on the basis of labels which are determined by means of the other calculation path.

It is thus ensured that the results of the task head network for training-related input data for which the neural network (and the task head network) has been trained provides similar results to the other calculation path, and, conversely, anomalies can be detected, since the result of the task-head network is highly likely to differ from the result of the other calculation path for said anomalies.

Exemplary embodiment 6 is a method according to any one of exemplary embodiments 1 to 5, wherein the image data are a first digital image and the further image data are at least a second digital image, and wherein the prediction task is an object classification of at least one object shown in the first digital image or a semantic segmentation of the first digital image.

The monitoring task (first determination of the optical flow) and the prediction task of object classification or semantic segmentation are closely related in this case, so that the qualities of the respective results correlate well and thus errors in the calculation of the optical flow on the basis of the representation indicate errors during the performance of the prediction task on the basis of the representation.

Exemplary embodiment 7 is a method according to any one of exemplary embodiments 1 to 6, wherein the result of the first determination of the optical flow and the result of the second determination of the optical flow are compared on the basis of image regions for a plurality of regions of the first digital image (and corresponding regions of the second digital image), the prediction task provides a prediction result for at least one of the regions and, for each region for which the prediction task provides a prediction result, the result of the prediction task for a region is accepted as correct if the result of the first determination of the optical flow agrees with the result of the second determination of the optical flow within a predefined tolerance for the region.

In other words, the correctness of the (first) determination of the optical flow can be checked locally and local prediction results can be accepted or discarded accordingly. In particular, errors in irrelevant image regions can thus be ignored (e.g., errors in the determination of the optical flow in the case of leaves of a tree that are located above the roadway; a correct representation in this region is typically irrelevant).

Exemplary embodiment 8 is a monitoring device which is configured to perform a method according to any one of exemplary embodiments 1 to 7.

Exemplary embodiment 9 is a computer program comprising commands which, when executed by a processor, cause the processor to perform a method according to any one of exemplary embodiments 1 to 7.

Exemplary embodiment 10 is a computer-readable medium that stores commands that, when executed by a processor, cause the processor to perform a method according to any one of exemplary embodiments 1 to 7.

In the figures, similar reference signs generally refer to the same parts throughout the various views. The figures are not necessarily true to scale, with emphasis instead generally being placed on the representation of the principles of the present invention. In the following description, various aspects are described with reference to the figures.

DETAILED DESCRIPTION OF EXAMPLE EMBODIMENTS

The following detailed description relates to the figures, which show, by way of explanation, specific details and aspects of this disclosure in which the present invention can be executed. Other aspects may be used and structural, logical, and electrical changes may be performed without departing from the scope of protection of the present invention. The various aspects of this disclosure are not necessarily mutually exclusive, since some aspects of this disclosure may be combined with one or more other aspects of this disclosure to form new aspects.

Various examples are described in more detail below.

Figure 1:
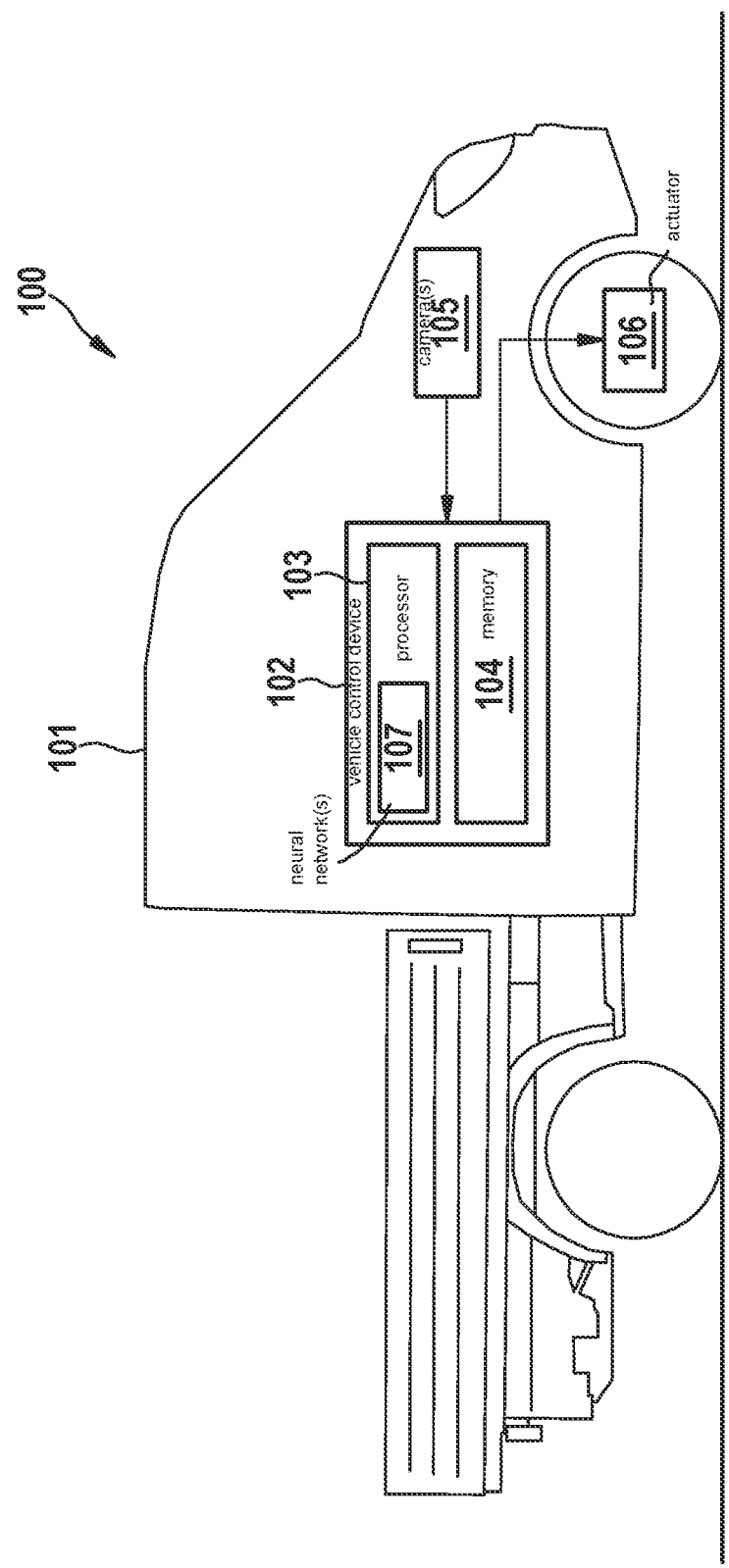
FIG. 1 shows a (e.g., autonomous) vehicle, according to an example embodiment of the present invention.

FIG. 1 shows a (e.g., autonomous) vehicle 101.

In the example of FIG. 1, the vehicle 101, for example a passenger car or truck, is provided with a vehicle control device 102.

The vehicle control device 102 comprises data-processing components, e.g., a processor (e. g. a CPU (central unit)) 103 and a memory 104 for storing control software, according to which the vehicle control device 102 operates, and data processed by the processor 103.

For example, the stored control software (computer program) comprises instructions which, when the processor executes them, cause the processor 103 to implement one or more neural networks 107.

The data stored in the memory 104 may include, for example, image data captured by one or more cameras 105. The one or more cameras 105 may, for example, capture one or more grayscale or color photographs of the surroundings of the vehicle 101. It should be noted that images or image data are very generally understood in the following as a collection of data that represent one or more objects or patterns. The image data may be provided by sensors that measure visible or invisible light, such as infrared or ultraviolet light, ultrasonic or radar waves, or other electromagnetic or acoustic signals.

On the basis of the image data, the vehicle control device 102 can determine whether and which objects, e.g., fixed objects such as traffic signs or road markings or moving objects such as pedestrians, animals and other vehicles, are present in the surroundings of the vehicle 101.

The vehicle 101 may then be controlled by the vehicle control device 102 according to the results of the object determination. For example, the vehicle control device 102 can control an actuator 106 (e.g., a brake) to control the speed of the vehicle, for example to brake the vehicle.

The object determination is carried out, for example, by an image classification or a semantic segmentation which is performed by the neural network 107. In the following, reference is also generally made to a prediction task which is performed by a neural network (which is correspondingly referred to as a neural prediction network).

In the case of a neural network, the case may arise in which said network is used for input data from a field for which it has not been trained or not sufficiently trained. In such a case, its prediction will not be reliable. An autoencoder or a similar approach can be used to detect input data (e.g., images) for which a neural network is uncertain. However, these approaches use a separate representation of the input space and therefore cannot consider the uncertainty of the specific neural network. In addition, the problem of reconstruction, for example of an input image, as takes place in such approaches, is very different from (and typically more difficult than) the prediction task (target task) to be performed by the neural network and for this reason the transferability of the findings obtained is questionable.

According to various embodiments, a learned representation is therefore used not only for the actual prediction task but also for a further task, specifically the determination of an optical flow. In addition, the further task is also solved in a second way, i.e., the optical flow is calculated by an independent algorithm (possibly not based on deep learning). The results of the two calculations of the optical flow (once on the basis of the representation and once on the basis of the algorithm not based on deep learning) are compared in order to detect an uncertainty of the result of the actual prediction task, i.e., the results of the prediction task are monitored in this way. In the calculation of the optical flow as a monitoring task, a dense uncertainty can be determined here, i.e., the uncertainty relates not only to an entire input value (in the form of a value for the whole image) but also to parts of the image, since deviations between the calculation results of the optical flow can be determined on a pixel-by-pixel basis. These local uncertainties can then be taken into account, for example in the control of a robot device. For example, a control guideline in the detection of (image-) local uncertainties can proceed according to the preference that the uncertain regions are to be bypassed and uncertainties in irrelevant regions can be ignored.

Figure 2:
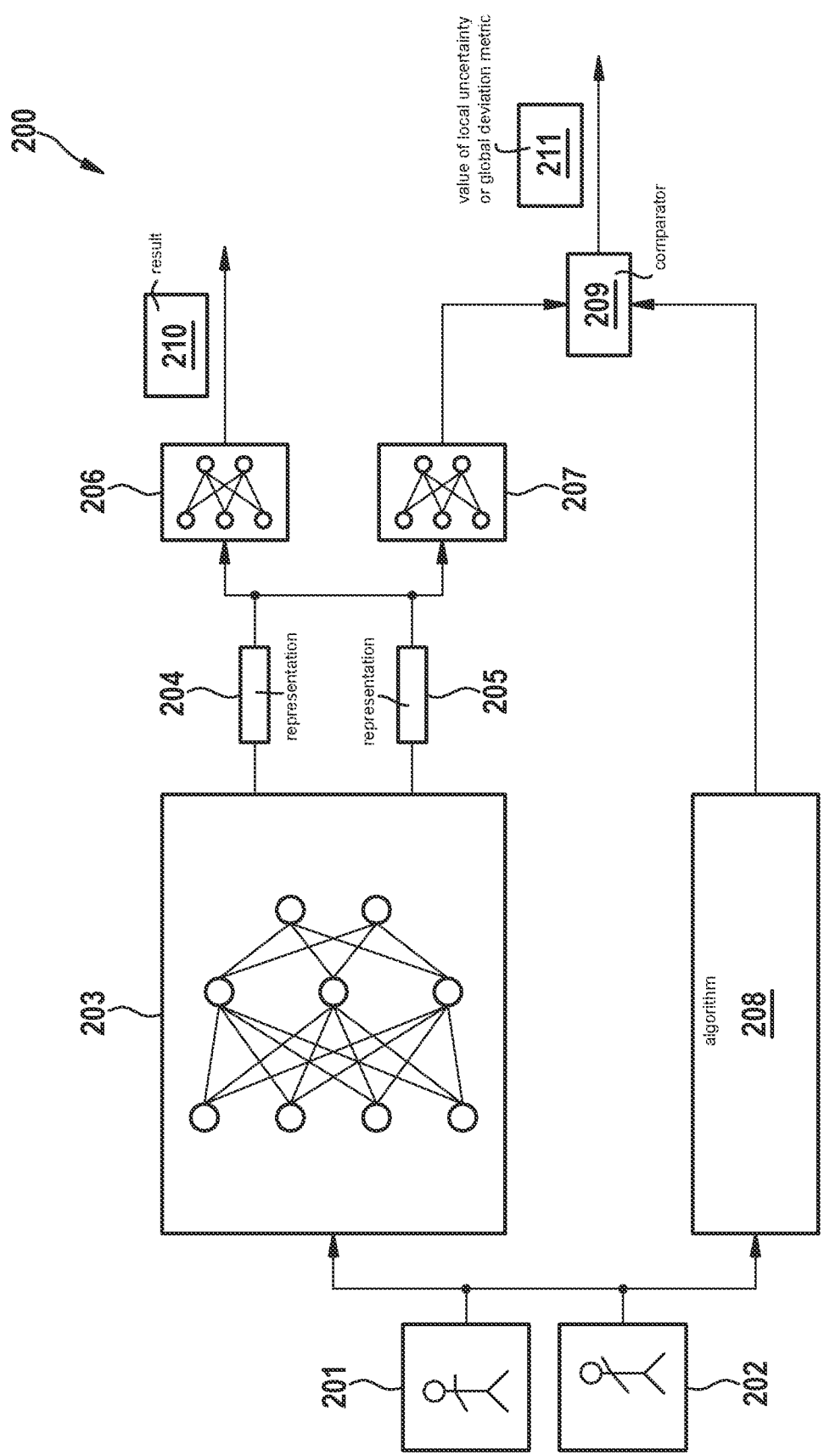
FIG. 2 shows an architecture for monitoring the performance of a prediction task, according to an example embodiment of the present invention.

FIG. 2 shows an architecture 200 for monitoring the performance of a prediction task. The architecture is, for example, implemented by the vehicle control device 102 and the prediction task is a task in the context of a driving task, such as an object detection.

The architecture includes a multi-task neural network that performs not only (at least) the prediction task (target task) but also calculates in parallel a prediction of the optical flow from a first input image 201 to a second input image 202.

The prediction task may may be based on individual images and the calculation of the optical flow is based on two (or even more) consecutive images.

A neural feature extraction network 203 determines a relevant representation 204, 205 (e.g., a feature map or a vector in a latent space for each image 201, 202. A first task head (neural sub-network for the prediction) 206 for the prediction task determines from the representation 204, 205 of an image (or, depending on the prediction task, also the representations of two or more images) a result 210 for the prediction task (e.g., segments the image).

A second task head (neural sub-network for determining an optical flow) uses, for monitoring the performance of the prediction task, at least one representation used by the first task head 206 and the representation of at least one further image (e.g., takes both representations 204, 205, wherein the first task head 206 has completed the representation 204 of the first image) and determines an optical flow from the representations.

The images, the representations of which are used by the second task head 207, e.g., the two images 201, 202, are in addition processed by a further (e.g., not based on a neural network) separately implemented algorithm 208, so that, in addition to the (first) result for the optical flow which the second task head 207 determines, there is a second result for the optical flow. For example, a motion estimation algorithm can be used for the second algorithm 208, as is also used in video compression, or any other "classic" algorithm can be used for determining an optical flow. However, it can also be implemented by a neural network that is trained separately for this task. In any case, it implements a different, independent mapping (function) of two or more input images onto an optical flow than is implemented by the sequential execution of the feature extraction network 203 and the second task head 207. In particular, the algorithm 208 will therefore output a different optical flow for anomalies, i.e., input images for which the feature extraction network 203 is poorly trained, than will be output by the sequential execution of the feature extraction network 203 and the second task head 207.

A comparator 209 compares these two results and can thereby calculate the value 211 of a local uncertainty (spatio-temporal) or of a global deviation (or uncertainty) metric. In other words, in the monitoring of the prediction task, the second result is used as a reference for detecting (local) inequalities in relation to the first result.

The second result can also be used as a label for training the first task head (beforehand, i.e., before the use for monitoring the prediction task). On the basis of the comparison, even difficult images can be detected, which are then weighted more heavily during the training of the feature extraction network 203.

The comparator 209 can be configured in such a way that it compensates for differences between the types of calculation of the optical flow. For this purpose, it can be suitably trained in parallel during the development phase, for example.

Figure 3:
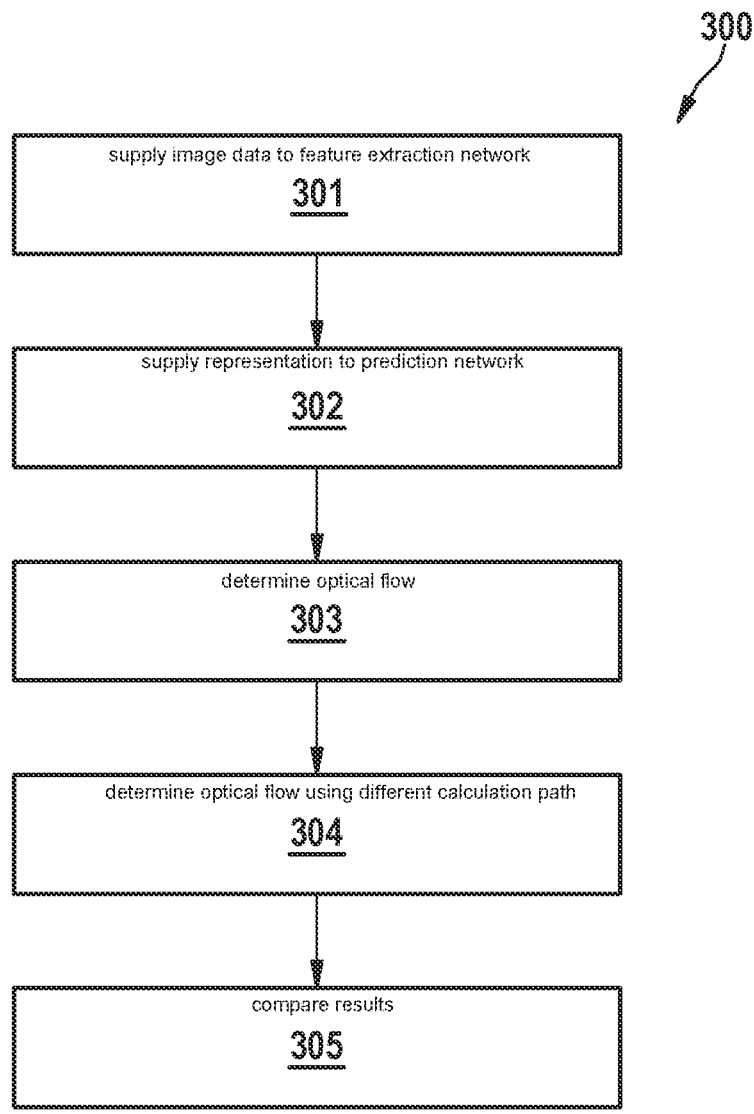
FIG. 3 shows a flowchart which represents a method for checking the performance of a prediction task by a neural network according to one example embodiment of the present invention.

In summary, according to various embodiments, a method is provided as shown in FIG. 3.

FIG. 3 shows a flow chart 300 illustrating a method for checking the performance of a prediction task by a neural network according to an embodiment.

In 301, image data are supplied to a feature extraction network that is trained to determine, for the image data supplied thereto, a representation of the image data for the performance of the prediction task.

In 302, the representation determined by the feature extraction network (for the image data) is supplied to a prediction network that is trained to perform the prediction task (for the image data).

The neural network, whose performance of the prediction task is being checked, comprises the feature extraction network and the prediction network.

In 303, an optical flow between the image data and further image data is determined from the representation.

In 304, the optical flow between the image data and the further image data is determined once again from the image data using a different calculation path than via the calculation of the representation and the determination of the optical flow from the representation (for example by a further neural network or by a "classic" algorithm, i.e., not based on deep learning). The optical flow is therefore determined from the image data by means of two calculation paths, wherein the second does not use the representation, that is to say operates independently of the representation (i.e., its result is not given by the representation or the calculation bypasses the representation) or is able to calculate the optical flow independently of such a representation. The two calculation paths thus implement different mapping rules between image data and optical flows.

In 305, the result of the first determination of the optical flow (from 303) and the result of the second determination of the optical flow (from 304) are compared with one another and a result of the prediction task is accepted as correct if the result of the first determination of the optical flow agrees with the result of the second determination of the optical flow within a predefined tolerance. In other words, the result of the prediction task (from 302) is further processed depending on whether the two results agree (taking into account a tolerance).

It should be noted that the above processing steps 301 to 305 need not necessarily be performed in the order shown. In addition, training can also be carried out in parallel (e.g., training for the feature extraction network of 301 in parallel with training the prediction network of 302).

The method of FIG. 3 may be performed by one or more computers with one or more data processing units. The term "data processing unit" may be understood as any type of entity that enables processing of data or signals. The data or signals can be treated, for example, according to at least one (i.e., one or more than one) special function which is performed by the data processing unit. A data processing unit can comprise or be formed from an analog circuit, a digital circuit, a logic circuit, a microprocessor, a microcontroller, a central processing unit (CPU), a graphics processing unit (GPU), a digital signal processor (DSP), an integrated circuit of a programmable gate array (FPGA) or any combination thereof. Any other way to implement the respective functions described in more detail herein may also be understood as a data processing unit or logic circuitry. One or more of the method steps described in detail here can be executed (e.g., implemented) by a data processing unit by one or more special functions that are performed by the data processing unit.

The method is therefore in particular computer-implemented according to various embodiments.

The prediction task may be used to generate a control signal for a robot device. The term "robot device" may be understood to refer to any technical system (comprising a mechanical part whose movement is controlled), such as a computer-controlled machine, a vehicle, a household appliance, a power tool, a manufacturing machine, a personal assistant or an access control system.

The prediction task is monitored by means of the monitoring task so that anomalies can be detected. For example, the comparison provides a measure of uncertainty and if this measure of uncertainty exceeds a threshold, an anomaly is reported and, for example, the relevant technical system is transferred into a safe mode in response (for example, in the case of a vehicle, the speed is reduced, a robot arm stopped, etc.).

Various embodiments may use sensor signals from various sensors, such as video, radar, lidar, ultrasound, motion, heat imaging, etc., as input data. In particular, "image data" can be understood as any type of data in image form (i.e., values assigned to pixels), i.e., not necessarily only as color image data. Accordingly, an optical flow may be an optical flow between sensor data other than color image data that are assigned to pixels. The sensor task can comprise the classification of the sensor data or the performance of a semantic segmentation of the sensor data, for example in order to detect the presence of objects (in the surroundings in which the sensor data were obtained). In particular, embodiments are applicable to the control and monitoring of the performance of manipulation tasks, for example, in assembly lines.

Embodiments may also be used for training (including validating and testing) a machine learning system by selecting suitable training data. For example, data with high uncertainty (local or global) with regard to the performance of the prediction task are selected, transmitted to a computer (thereby reducing data traffic since only selected data are transmitted) and are subsequently used for training, validation or testing.

Embodiments can thus be used for training (including learning a control guideline), generating training data, and testing, verifying or validating in order to check whether a trained ML system may be safely operated. An ML system trained in this way can then be used for the prediction task (wherein it can then continue to be monitored by means of the monitoring task).

Although specific embodiments have been depicted and described herein, a person skilled in the art will recognize that the specific embodiments shown and described may be replaced with a variety of alternative and/or equivalent implementations without departing from the scope of protection of the present invention. This application is intended to cover adaptations or variations of the specific embodiments discussed herein.

What is claimed is:

1. A method for checking performance of a prediction task by a neural network, comprising the following steps:
    supplying image data to a feature extraction network that is trained to determine, for the image data supplied to the feature extraction network, a representation of the image data for the performance of the prediction task;
    supplying the representation determined by the feature extraction network to a prediction network that is trained to perform the prediction task;
    performing a first determination of an optical flow between the image data and further image data from the representation;
    performing a second determination of the optical flow between the image data and the further image data from the image data using a different calculation path than via the determination of the representation and the determination of the optical flow from the representation; and
    comparing a result of the first determination of the optical flow with a result of the second determination of the optical flow and accepting a result of the prediction task as correct based on the result of the first determination of the optical flow agreeing with the result of the second determination of the optical flow within a predefined tolerance.

2. The method according to claim 1, wherein the prediction task is a prediction task for control of a robot device, and the robot device is controlled based on the result of the prediction task when the result of the first determination of the optical flow agrees with the result of the second determination of the optical flow within the predefined tolerance.

3. The method according to claim 2, wherein a safety measure is taken in the control of the robot device when the result of the first determination of the optical flow does not agree with the result of the second determination of the optical flow within the predefined tolerance.

4. The method according to claim 1, wherein further training of the prediction network is performed when the result of the first determination of the optical flow does not agree with the result of the second determination of the optical flow within the predefined tolerance.

5. The method according to claim 1, wherein the first determination of an optical flow between the image data and further image data from the representation is performed using a neural task head network and the neural task head network is trained based on labels which are determined using the other calculation path.

6. The method according to claim 1, wherein the image data are a first digital image and the further image data are at least a second digital image, and wherein the prediction task is an object classification of at least one object shown in the first digital image or a semantic segmentation of the first digital image.

7. The method according to claim 1, wherein the result of the first determination of the optical flow and the result of the second determination of the optical flow are compared based on image regions for a plurality of regions of the first digital image, the prediction task provides a production result for at least one of the regions and, for each region for which the prediction task provides the production result, the result of the prediction task for a region is accepted as correct when the result of the first determination of the optical flow agrees with the result of the second determination of the optical flow within a predefined tolerance for the region.

8. A monitoring device configured to check performance of a prediction task by a neural network, the monitoring device configured to:
supply image data to a feature extraction network that is trained to determine, for the image data supplied to the feature extraction network, a representation of the image data for the performance of the prediction task;
supply the representation determined by the feature extraction network to a prediction network that is trained to perform the prediction task;
perform a first determination of an optical flow between the image data and further image data from the representation;
perform a second determination of the optical flow between the image data and the further image data from the image data using a different calculation path than via the determination of the representation and the determination of the optical flow from the representation; and
compare a result of the first determination of the optical flow with a result of the second determination of the optical flow and accepting a result of the prediction task as correct based on the result of the first determination of the optical flow agreeing with the result of the second determination of the optical flow within a predefined tolerance.

9. A non-transitory computer-readable medium on which is stored commands for checking performance of a prediction task by a neural network, the commands, when executed by a processor, causing the processor to perform the following steps:
supplying image data to a feature extraction network that is trained to determine, for the image data supplied to the feature extraction network, a representation of the image data for the performance of the prediction task;
supplying the representation determined by the feature extraction network to a prediction network that is trained to perform the prediction task;
performing a first determination of an optical flow between the image data and further image data from the representation;
performing a second determination of the optical flow between the image data and the further image data from the image data using a different calculation path than via the determination of the representation and the determination of the optical flow from the representation; and
comparing a result of the first determination of the optical flow with a result of the second determination of the optical flow and accepting a result of the prediction task as correct based on the result of the first determination of the optical flow agreeing with the result of the second determination of the optical flow within a predefined tolerance.

* * * * *